United States Patent
Tsunoda et al.

[11] Patent Number: 5,289,729
[45] Date of Patent: Mar. 1, 1994

[54] DISPLACEMENT DETECTOR

[75] Inventors: Mitsuru Tsunoda; Shigeru Ohtani, both of Kawasaki, Japan

[73] Assignee: Mitutoyo Corporation, Tokyo, Japan

[21] Appl. No.: 779,827

[22] Filed: Oct. 21, 1991

[30] Foreign Application Priority Data

Oct. 22, 1990 [JP] Japan .................................. 2-285646

[51] Int. Cl.⁵ .......................... G01B 3/22; G01B 3/18;
G01D 11/18; G01D 3/08
[52] U.S. Cl. .................................. 73/866.1; 33/819;
33/571
[58] Field of Search ................. 73/866.1; 33/571, 819,
33/820

[56] References Cited

U.S. PATENT DOCUMENTS

| 3,668,782 | 6/1972 | Hanft | 33/571 |
|---|---|---|---|
| 4,024,767 | 5/1977 | Kampf | 73/866.1 |
| 4,114,280 | 9/1978 | Rucinski | 73/866.1 X |
| 4,129,039 | 12/1978 | Pignato | 73/866.1 X |
| 4,578,868 | 4/1986 | Sasaki et al. | 33/819 |
| 4,695,720 | 9/1987 | Rieder et al. | 250/237 G X |
| 4,765,064 | 8/1988 | Maeda | 33/832 |

FOREIGN PATENT DOCUMENTS

| 1135192 | 8/1962 | Fed. Rep. of Germany | 73/866.1 |
|---|---|---|---|
| 1949034 | 4/1971 | Fed. Rep. of Germany | 33/571 |
| 881526 | 11/1981 | U.S.S.R. | 73/866.1 |

*Primary Examiner*—Tom Noland
*Attorney, Agent, or Firm*—Flynn, Thiel, Boutell & Tanis

[57] ABSTRACT

A displacement detector which supports either the main scale or the grid to move in a direction perpendicularly intersecting the relative movement direction of the spindle, and which has a spring for pushing one of the main scale and grid toward the other, protrusions for maintaining a predetermined clearance between the urged one of the main scale and grid and the other, and a clearance limiting device for limiting a displacement of the urged one of the main scale and grid from the other to a limited clearance distance to prevent a loss of measuring continuity.

7 Claims, 4 Drawing Sheets

DISPLACEMENT DETECTOR

BACKGROUND OF THE INVENTION

1. Field of the Invention

This invention relates to a displacement detector and, more particularly, to an improvement in a displacement detector having a main scale and a grid which relatively move in a state that oppose one another with regular intervals.

2. Description of the Related Art

Such a displacement detector wherein a main scale and a grid move relatively to one another in an opposite state and wherein the relative movement is detected as an electronic signal, is widely utilized in a so-called digital gauge, digital caliper or digital micrometer.

Taking for an example, a digital gauge has a spindle capable of moving along its axis direction in a gauge body, a main scale integrally provided on the spindle, and a grid fixed in the gauge body so as to oppose the main scale, so that the displacement value of the spindle can be detected by converting the relative movement of the main scale and corresponding gird to an electric signal.

It is important to the accuracy of the displacement detector to maintain a regular interval between the main scale and the grid.

The conventional grid has protrusions which contact with a surface of the main scale opposite to the grid, the protrusions being urged by a spring toward the main scale to thereby maintain the regular intervals.

Since to maintain the grid in contact with the main scale can be done by the spring, when the conventional displacement detector is influenced by a sudden impact or vibration while measuring, the grid may be momentary taken off the main scale against the urging force of the spring. At the time, at which the interval between the main scale and the grid becomes wide, electrical malfunctions such as a miss-counting and a miss-display may happen to thereby incorrectly indicate the displacement value.

To solve such problems, separation of the grid from the main scale can be precluded, by using a stronger spring, when the displacement detector is influenced by a sudden impact or vibration while measuring. But, the main scale can not move smoothly, because the protrusions are urged against the main scale too strongly, so that the durability of the detector will be shortened.

An object of the present invention is to solve the mentioned problems and to provide a displacement detector which has such features that the relative movement of the main scale and grid is smooth, the detection of the relative movement value is done accurately when influenced by a sudden impact or vibration while measuring, and the manufacturing cost is reasonable.

SUMMARY OF THE INVENTION

Hence, in the present invention, an urging force by an urging means for pushing one of the main scale or grid toward the other is weak not to harm the relative movement of them and if the one is displaced from the other due to a sudden impact or vibration, the displacement value will be regulated within a range in which any electrical failure will not take place.

Therefore, the present invention is a displacement detector having a main scale and grid moving relatively in a state opposing each other and detecting a value of the relative movement as an electrical signal, comprising: means for supporting either the main scale or grid to move in a direction perpendicularly intersecting the relative movement direction of the spindle; urging means for pushing one of the main scale and grid toward the other; means for maintaining a predetermined clearance between the urged one of the main scale and grid and the other; and clearance limiting means for allowing a displacement of the urged one of the main scale and grid from the other within the predetermined clearance.

The clearance limiting means may be capable of controlling the displacement value of the urged one of the main scale and grid from the other.

Incidentally, the displacement value controlled by the clearance limiting means is adjusted by driving or loosening a screw.

The means for supporting may be a plate spring being disposed so as to perpendicularly intersect a moving direction of the main scale.

The urging means is a coil spring provided on the same axis as that of the clearance limiting means.

As for a spring pressure of the coil spring, it should be weak enough to smoothly slide the means for maintaining the predetermined clearance.

The means for maintaining the predetermined clearance is preferably to be a plurality of semi-spherical protrusions.

As the detector it can be a digital gauge, a digital caliper or a digital micrometer.

In such a displacement detector, when the main scale and the grid are move relatively to one another, the displacement value is detected as an electric signal. If either the main scale of the grid, for example, the grid is separated from the main scale due to a sudden impact or vibration, the displacement will be limited within the clearance. As a result, the grid will not separate from the main scale beyond the predetermined value.

Hence, the allowable displacement value of the clearance limiting means is preliminarily set to within a degree not causing any electrical failures resulting in a miss-counting or display error. This is also advantageous for the smooth relative movement of the main scale and the grid, since it is not necessary to use a rather strong urging force of the urging means.

Since the displacement of one of the main scale and grid from the other is limited to within the predetermined value set by the clearance limiting means, if either the main scale or the grid is fixed up in a state tilting with reference to the other, the predetermined value will be able to set off the displacement caused by the tilting. Accordingly, the dimensional tolerances of each part and accurate assembling techniques should not be necessary to thereby attain low cost construction.

BRIEF DESCRIPTION OF THE DRAWINGS

The drawings show a preferable embodiment of the present invention, namely.

DETAILED DESCRIPTION OF THE PREFERRED EMBODIMENT(S)

Figure 4:
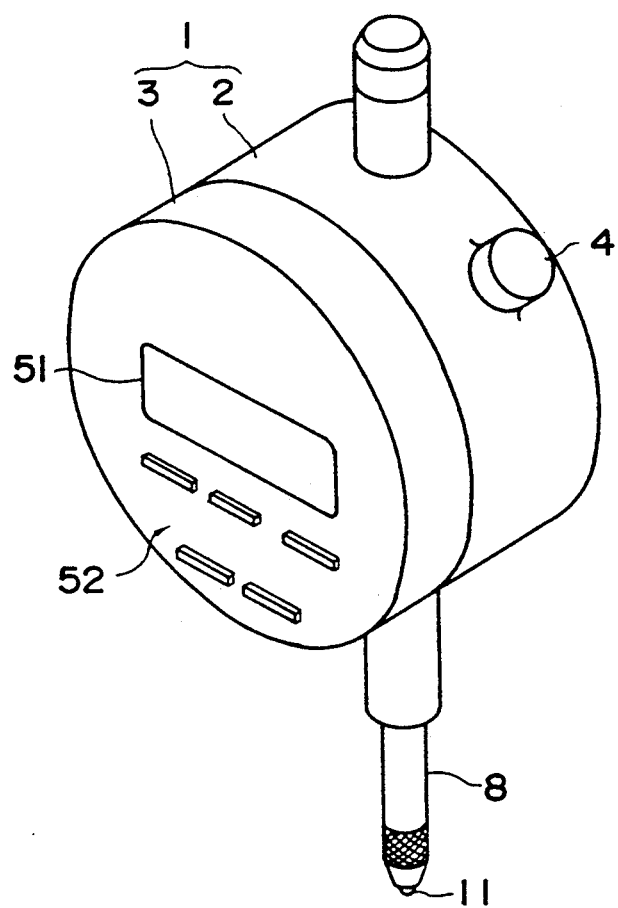
FIG. 4 is a perspective showing an exterior appearance of the digital gauge.

The following description relates to a preferable embodiment of a displacement detector used in a digital gauge with reference to the drawings. In these drawings, a gauge body 1 (FIG. 4) consists of a frame 2 having a cylindrical shape and a cover 3 covering a front side of the frame 2.

Figure 1A:
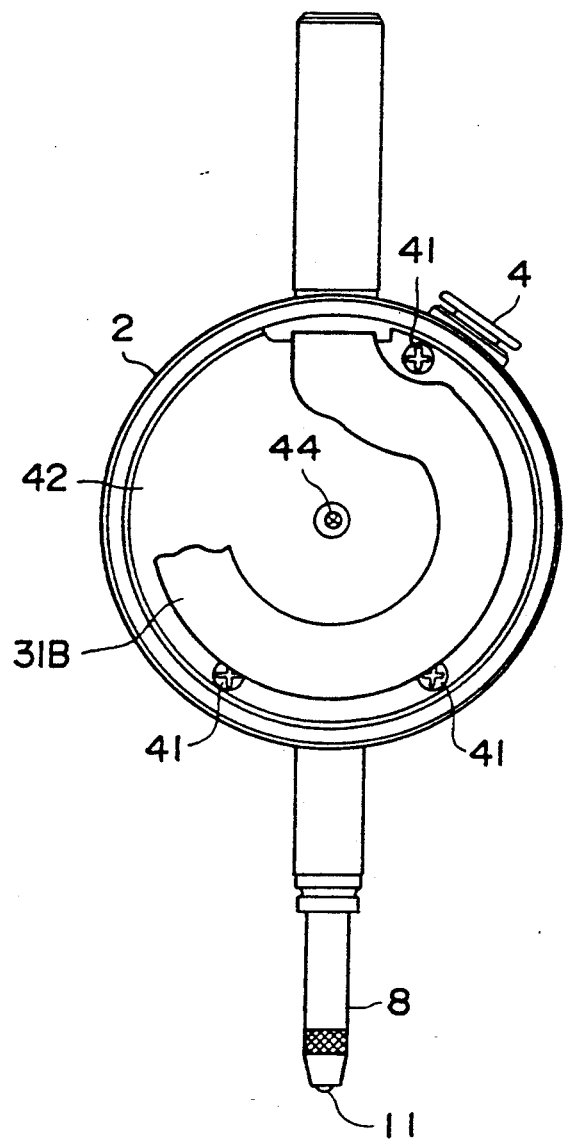
FIG. 1(A) and FIG. 1(B) are, respectively, a front view and a sectional view of a digital gauge without corresponding cover.
Figure 1B:
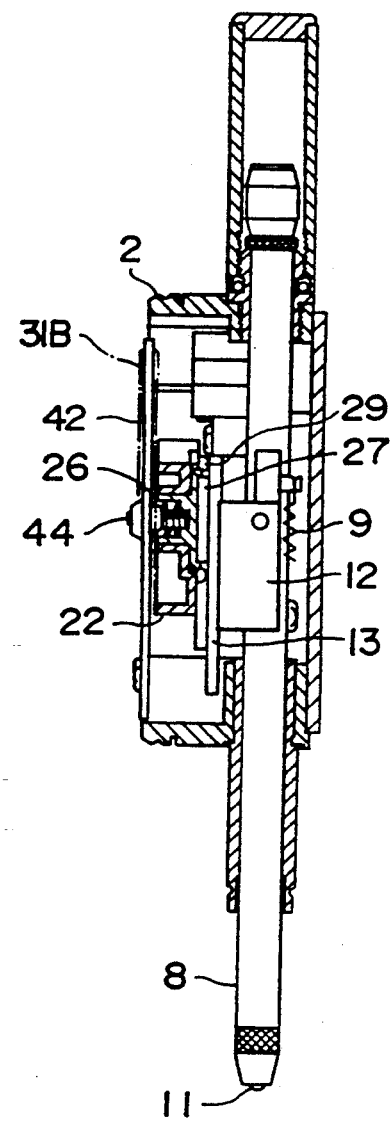
Figure 3:
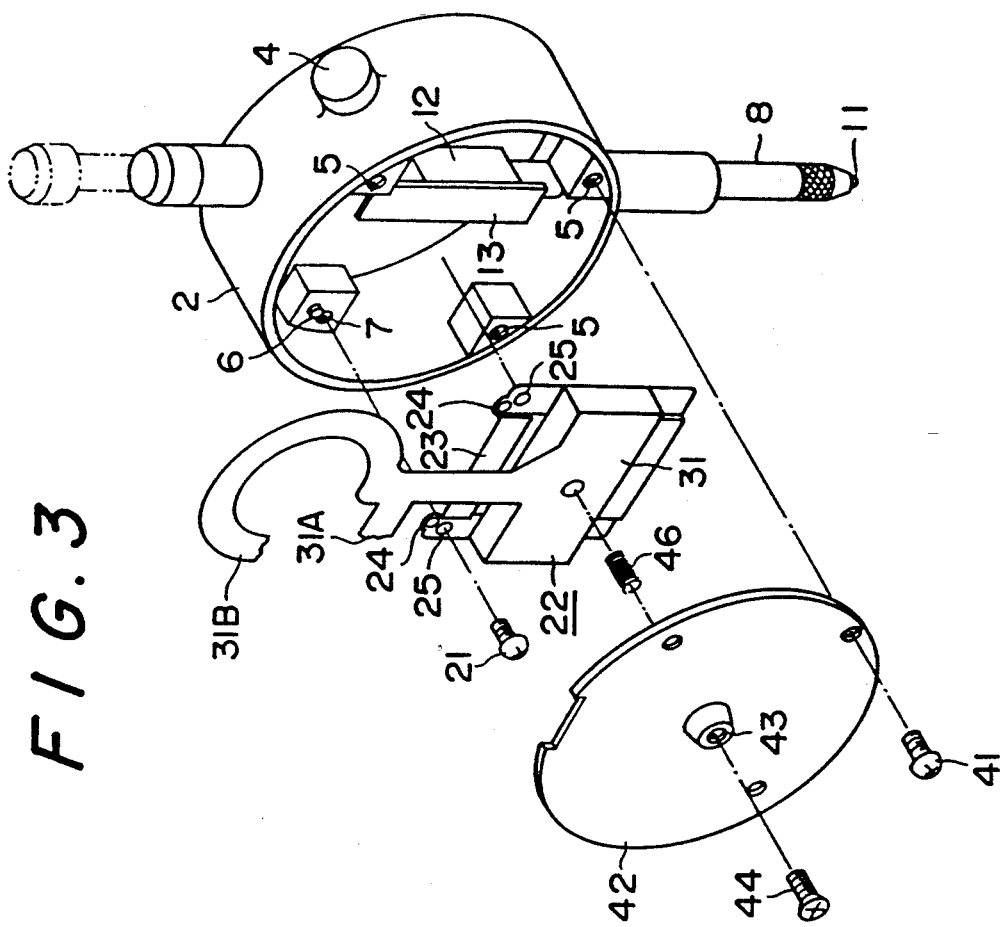
FIG. 3 is an exploded perspective.
Figure 3:
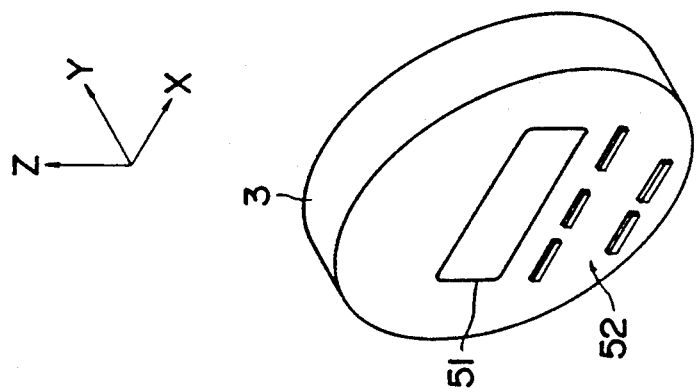

The frame 2 comprises an output terminal 4, on the outer surface, connecting with a not-shown processing device, three female screw holes 5 provided at the inner surface, two female screw holes 7 (one of which is drawn in FIG. 3) each having a pin 6, and a spindle 8 which extends through the center of the frame 2 and is capable of moving along its axis. The spindle 8 is continuously urged in the axial direction, that is, downwardly in FIG. 1.

The spindle 8 has a measuring element 11, like a ball at its lower end portion and a main scale 13 via a mounting plate 12 oriented at a middle portion in the frame 2. Provided on one surface of the main scale 13 along the moving direction of the spindle 8 is a grid micrometer ordered.

The two female screw holes 7 in the frame 2, each having adjacent thereto the pin 6 receives set screws 21 therein to fasten a slider 22 to the housing. The slider 22 has a plate spring 23 capable of being flexed in a direction which perpendicularly intersects the axis of the spindle 8. At both ends of the plate spring 23 are provided holes 24 associating with the pins 6 and other holes 25 into which the set screws 21 are inserted.

Hence, when both holes 24 of the plate spring 23 are aligned with the two pins 6 and the set screws 21 are then screwed into the female screw holes through the holes 25, the slider 22 is integrated so as to only move in a direction perpendicularly toward the moving direction of the spindle 8. Supposing the moving direction of the spindle 8 is along a "Z" axis, other directions perpendicular to the Z-direction are the "X" and the "Y" axis, the slider 22 is capable of moving in the "Y" axis direction but incapable of displacement in the "X" and "Z" directions.

Figure 2:
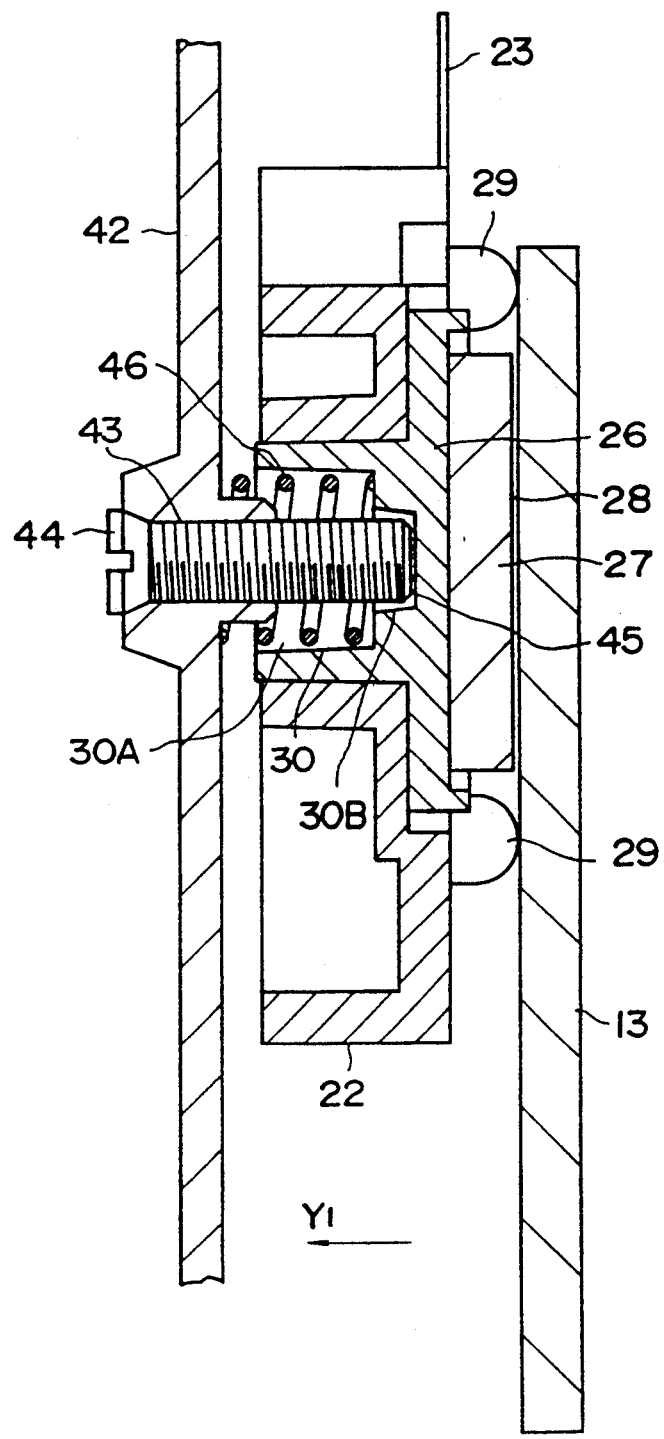
FIG. 2 is an enlarged sectional view of an essential portion of the digital gauge.

The slider 22 has, as shown in FIG. 2 in an enlarged state, a grid 27 supported by a holder 26 so as to oppose the main scale 13 and semi-spherical protrusions 29 as a means for regularly maintaining a clearance 28 between the main scale 13 and the grid 27. The grid 27 has, on a side opposing the main scale, the same grid pattern micrometer ordered as the main scale 13.

The holder 26 has, on its reverse side, a hollow bass 30 consisting of a large recess 30A and a small recess 30B. On a front side of the slider 22, that is, a side opposite the surface on which the grid 27 is attached, a wiring member 31 is connected with the grid 27. One end 31A of the wiring member 31 is connected to the output terminal 4 on the frame 2. The other end 31B is led through a disk 42 to the inside of the cover 3 and then is connected to a not-shown processing means in the cover 3.

At the three female screw holes 5 in of the frame 2, the disk 42 is fixed to the outside of the slider 22 by adjusting screws 41. The disk 42 has a female screw hole 43 at the center thereof. Into the female screw hole 43 is received a clearance adjusting screw 44 as a clearance limiting device which permits a predetermined displacement of the slider 22 toward and away from the main scale 13.

The clearance adjusting screw 44 allows and limits the departing motion of the slider 22 or the grid 27 within a space occupied by the top surface of the screw 44 and the bottom surface of the small recess 30B. The space 45 can be controlled by driving or loosening the screw 44. The clearance 28 is always maintained within a certain degree so that an electrical failure does not take place when the grid 27 is separated from the main scale 13 due to a sudden impact or vibration while measuring.

Between the reverse side of the disk 42 and the large recess 30A of the holder 26 is provided a coil spring 46 as a means for urging or pushing the protrusions 29 mounted to the slider 22 toward the surface of the main scale 13. The spring pressure of the coil spring 46 is set to such a rather weak degree that the protrusions 29 can maintain a sliding relation on the surface of the main scale 13 while the spindle is moving.

The front of the cover 3 is provided with a display 51 far indicating a measured value by digits and switches 52, such as a reset switch, an on-and-off switch and the like.

An operation of the present invention will be explained hereinafter for convenience.

At the beginning of a measuring task, the digital gauge should be mounted on a not-shown stand and adjusted such that the digit on the display 51 shows "0".

Then, the spindle 8 is urged upwardly by fingers against the urging of the spring 9. A not-shown object to be measured is put on the stand and contacted with the measuring element 11 of the spindle 8 moving downwardly in FIG. 1. Incidentally, the main scale 13 and the grid 27 move relatively, and the signal of the relative movement is put into the processing means through the wiring member 31, so that the dimensions of the object can be shown on the display 51 by digits.

If a sudden impact or vibration is given to the digital gauge while measuring and the slider 22 is then separated from the main scale 13 against the coil spring 46, the grid 27 does not depart from the main scale 13 more than the certain displacement value because the displacement value is defined by the clearance 45 between the screw 44 and the inside bottom wall of the small recess 30B. Hence, such an electrical failure as a miss-counting or display error will be prevented.

In case the main scale 13 is fixed up in a state tilted to the $Y_1$ direction as designated in FIG. 2, with reference to the spindle 8 or the mounting plate 12, the slider 22 will naturally be shifted to the $Y_1$ direction, too. But, the displacement toward the $Y_1$ direction can be set off by the clearance 45 between the screw 44 and the inside bottom wall of the small recess 30B.

As has been explained above, the slider 22 having the grid 27 is capable of shifting in a direction perpendicularly toward the moving direction of the spindle 8 having the main scale 13. And the slider 22 has the protrusions 29 for maintaining the predetermined clearance 28 between the main scale 13 and the grid 27, in which the protrusions 29 are urged by the coil spring 46 so as to contact with the main scale 13, and in which the separating shift of the slider 22 from the main scale 13 is allowed within the predetermined limit defined by the screw 44, so that if the slider 22 is separated from the main scale 13 due to a sudden impact or vibration, the displacement will be limited within the clearance 45 between the screw 44 and the inside bottom wall of the small recess 30B. As a result, the grid 27 will not separate from the main scale 13 beyond the predetermined value.

Hence, any electrical failures can be prevented provided the clearance 45, between the screw 44 and the inside bottom wall 45 of the small recess 30B, is maintained within a degree not causing a miss-counting or display error. This is also advantageous for the smooth relative movement of the main scale 13 and the grid 27, since it is not necessary to use a rather strong coil spring 46.

Between the screw 44 and the inside bottom wall of the small recess 30B is provided the clearance 45, so that if the main scale 13 is fixed up in a tilted state toward, for example, the $Y_1$ axis direction with reference to the spindle 8 or the mounting plate 12, the displacement toward the $Y_1$ axis direction will be able to be set off by the clearance 45. Accordingly, the dimensional tolerances of each part and an accurate assembling technique should not be necessary to thereby attain reduced costs.

The screw 44 can control the degree of the clearance 45 by a driving and a loosening thereof, so that accurate dimensional tolerance of each part and accurate assembling techniques should not be necessary.

Since the slider 22 having the grid 27 only moves in a Y axis direction caused by the spring 23 that is, neither the Z nor the X axes directions, the grid 27 can maintain its positioning with reference to the main scale 13. From this view point, such an electrical failure resulting in a miss-counting or a display error can be prevented. The slider 22 having the grid 27 is continuously urged toward the main scale 13 by the coil spring 46, that is, the relative relationship between the slider 22 and the main scale 13 is maintained even under a tilted state, so that the measurement will be always be accurate if the measuring style is changed.

In the above descriptions, the present invention is explained in with reference 8 the most preferable embodiment, but can be explained in other modifications provided the subjects of the present invention are the same.

For example, in the above embodiment, the spindle 8 has the main scale 13 and the grid 27 supported so as to displace in a direction perpendicularly intersecting the moving direction of the spindle 8 with reference to the main scale 13. The main scale 13 may be alternatively arranged to move in a direction perpendicularly intersecting the relative moving direction with reference to the grid 27.

The means, for displacing either the grid 27 or the main scale 13 in a direction perpendicularly intersecting the relative moving direction, may not only be the plate spring 23 but a guide.

The protrusion 29 may be provided at the side of the main scale 13.

The present invention may not only be utilized in the mentioned digital gauge, but in a digital caliper and a digital micrometer.

As has been mentioned above, according to the present invention, the relative movement of the main scale and the grid can be in a preferable state and an electrical failure will not take place, even if a sudden impact or vibration accurs to the gauge while measuring. Hence the relative movement can be detected accurately with a less expense device.

What is claimed is:

1. A displacement detector having a main scale and grid opposing each other and movable in an axial movement direction with respect to each other and detecting a value of the relative movement as an electrical signal, comprising:
    housing means;
    support means on said housing means for supporting at least one of the main scale and grid for movement in a direction perpendicularly intersecting the relative axial movement direction;
    urging means for pushing one of the main scale and grid toward the other;
    means for maintaining a predetermined clearance dimension between the urged one of the main scale and grid and the other thereof; and
    clearance limiting means for adjustably limiting a separating displacement of the urged one of the main scale and grid from the other to a limited clearance distance to prevent a loss of measuring continuity.

2. The displacement detector according to claim 1, wherein said clearance limiting means includes a screw, a magnitude of the separation displacement being adjusted by a driving or a loosening of said screw.

3. The displacement detector according to claim 1, wherein said support means is a plate spring disposed on said housing means so as to flex in a direction which perpendicularly intersects the axial moving direction of the main scale.

4. The displacement detector according to claim 1, wherein said urging means is a coil spring provided on a common axis with said clearance limiting means.

5. The displacement detector according to claim 5, wherein spring pressure of said coil spring is sufficient for said pushing but weak enough to facilitate a smooth sliding of said means for maintaining the predetermined clearance.

6. The displacement detector according to claim 1, wherein said means for maintaining the predetermined clearance is a plurality of semi-spherical protrusions.

7. The displacement detector according to claim 1, wherein said detector is a digital gauge.

* * * * *

UNITED STATES PATENT AND TRADEMARK OFFICE
CERTIFICATE OF CORRECTION

PATENT NO. : 5 289 729

DATED : March 1, 1994

INVENTOR(S) : Mitsuru TSUNODA et al.

It is certified that error appears in the above-identified patent and that said Letters Patent is hereby corrected as shown below:

Column 6, line 46; change "Claim 5" to ---Claim 4---.

Signed and Sealed this

Second Day of August, 1994

Attest:

BRUCE LEHMAN

Attesting Officer

Commissioner of Patents and Trademarks